(12) United States Patent
Wang et al.

(10) Patent No.: US 9,084,232 B2
(45) Date of Patent: Jul. 14, 2015

(54) METHODS AND APPARATUS FOR DETECTION OF RESOURCE COLLISION IN WIRELESS PEER-TO-PEER COMMUNICATION NETWORKS

(75) Inventors: Ying Wang, Easton, PA (US); Sundar Subramanian, Somerville, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 12/965,399

(22) Filed: Dec. 10, 2010

(65) Prior Publication Data

US 2012/0147745 A1 Jun. 14, 2012

(51) Int. Cl.
| | |
|---|---|
| *H04L 12/26* | (2006.01) |
| *H04W 76/02* | (2009.01) |
| *H04L 1/00* | (2006.01) |
| *H04W 74/08* | (2009.01) |
| *H04L 1/16* | (2006.01) |

(52) U.S. Cl.
CPC ........... *H04W 76/021* (2013.01); *H04L 1/0026* (2013.01); *H04L 1/1671* (2013.01); *H04W 74/0841* (2013.01); *H04W 76/023* (2013.01)

(58) Field of Classification Search
None
See application file for complete search history.

(56) References Cited

U.S. PATENT DOCUMENTS

| 6,665,300 | B1 | 12/2003 | Caves et al. |
| 8,005,091 | B2 | 8/2011 | Wu et al. |
| 8,134,931 | B2 | 3/2012 | Laroia et al. |
| 8,494,007 | B2 | 7/2013 | Li et al. |
| 2003/0223450 | A1* | 12/2003 | Bender et al. ................ 370/441 |
| 2007/0147377 | A1* | 6/2007 | Laroia et al. ................. 370/392 |
| 2009/0016219 | A1 | 1/2009 | Laroia et al. |
| 2009/0017801 | A1* | 1/2009 | Laroia et al. .............. 455/414.1 |
| 2009/0019165 | A1* | 1/2009 | Li et al. ......................... 709/227 |
| 2009/0019169 | A1 | 1/2009 | Li et al. |
| 2010/0202400 | A1 | 8/2010 | Richardson et al. |
| 2010/0260153 | A1* | 10/2010 | Hollick et al. ............... 370/336 |

FOREIGN PATENT DOCUMENTS

| WO | WO2008147161 A1 | 12/2008 |
| WO | WO2009009352 | 1/2009 |
| WO | WO-2009009364 A1 | 1/2009 |
| WO | WO-2009009387 | 1/2009 |
| WO | WO2009009390 | 1/2009 |
| WO | WO-2009009537 | 1/2009 |

OTHER PUBLICATIONS

International Search Report and Written Opinion—PCT/US2011/063996—ISA/EPO—Apr. 17, 2012.

\* cited by examiner

*Primary Examiner* — Nicholas Sloms

(74) *Attorney, Agent, or Firm* — James K. O'Hare

(57) ABSTRACT

A method of operating a wireless device includes selecting a CID with a first node and receiving a signal including an LID on a resource. At least one of the signal or the resource is based on the selected CID. The method further includes determining a presence of a second node using the selected CID based on the LID in the received signal. Another method of operating a wireless device includes selecting a CID with a first node and sending a signal including an LID on a resource. At least one of the signal or the resource is based on the selected CID.

22 Claims, 17 Drawing Sheets

`US 9,084,232 B2`

METHODS AND APPARATUS FOR DETECTION OF RESOURCE COLLISION IN WIRELESS PEER-TO-PEER COMMUNICATION NETWORKS

BACKGROUND

1. Field

The present disclosure relates generally to communication systems, and more particularly, to detection of resource collision in wireless peer-to-peer communication networks.

2. Background

In wireless peer-to-peer networks, multiple links compete for the same communication resources. A connection identifier (CID) may be assigned to a link in order for the link to signal its presence to other links and eventually contend for traffic resources. To avoid signaling conflicts, each link should have a unique CID. Due to a limited number of CIDs, more than one link may share the same CID when the links are not in proximity to each other (i.e., their coexistence would not cause much effect in signaling their presence correctly to other links). Two links not in proximity and with the same CID may come closer to each other and suffer a CID collision. In such situations, mechanisms are needed to quickly detect CID collisions.

SUMMARY

In an aspect of the disclosure, a method of operating a wireless device includes selecting a CID with a first node and receiving a signal including a link identifier on a resource. At least one of the signal or the resource is based on the selected CID. The method further includes determining a presence of a second node using the selected CID based on the link identifier in the received signal.

In an aspect of the disclosure, a method of operating a wireless device includes selecting a CID with a first node and sending a signal including a link identifier on a resource. At least one of the signal or the resource is based on the selected CID.

DETAILED DESCRIPTION

Figure 1:
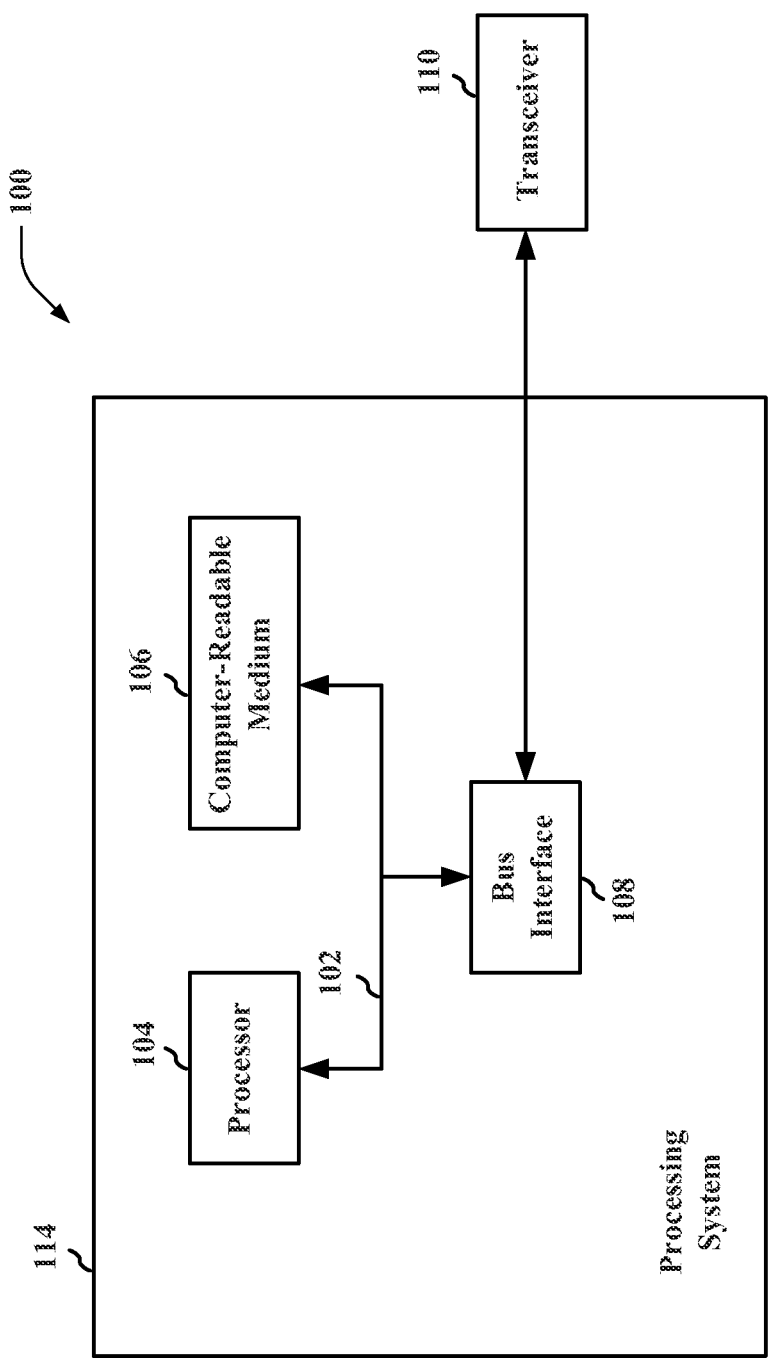
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
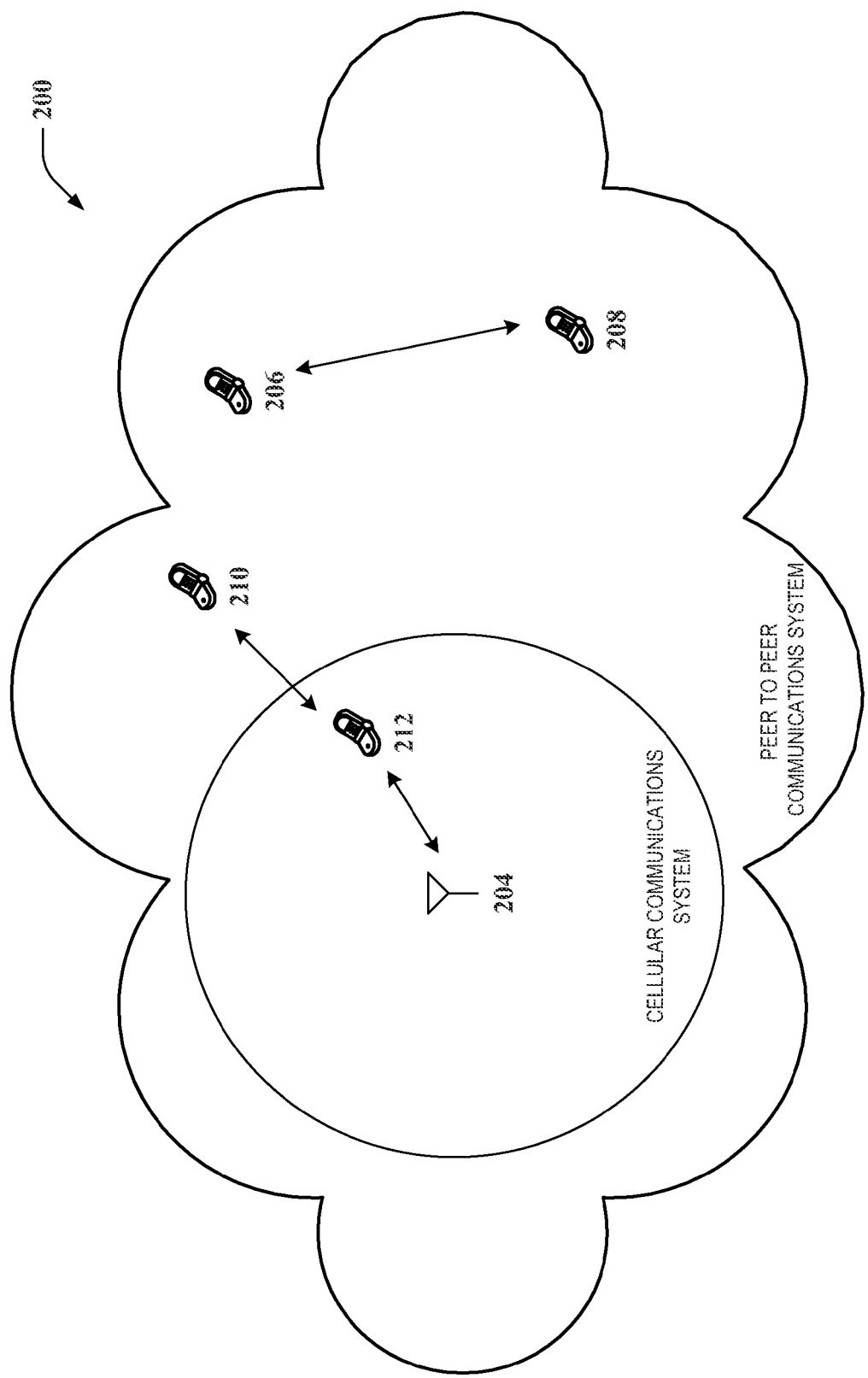
FIG. 2 is a drawing of an exemplary wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
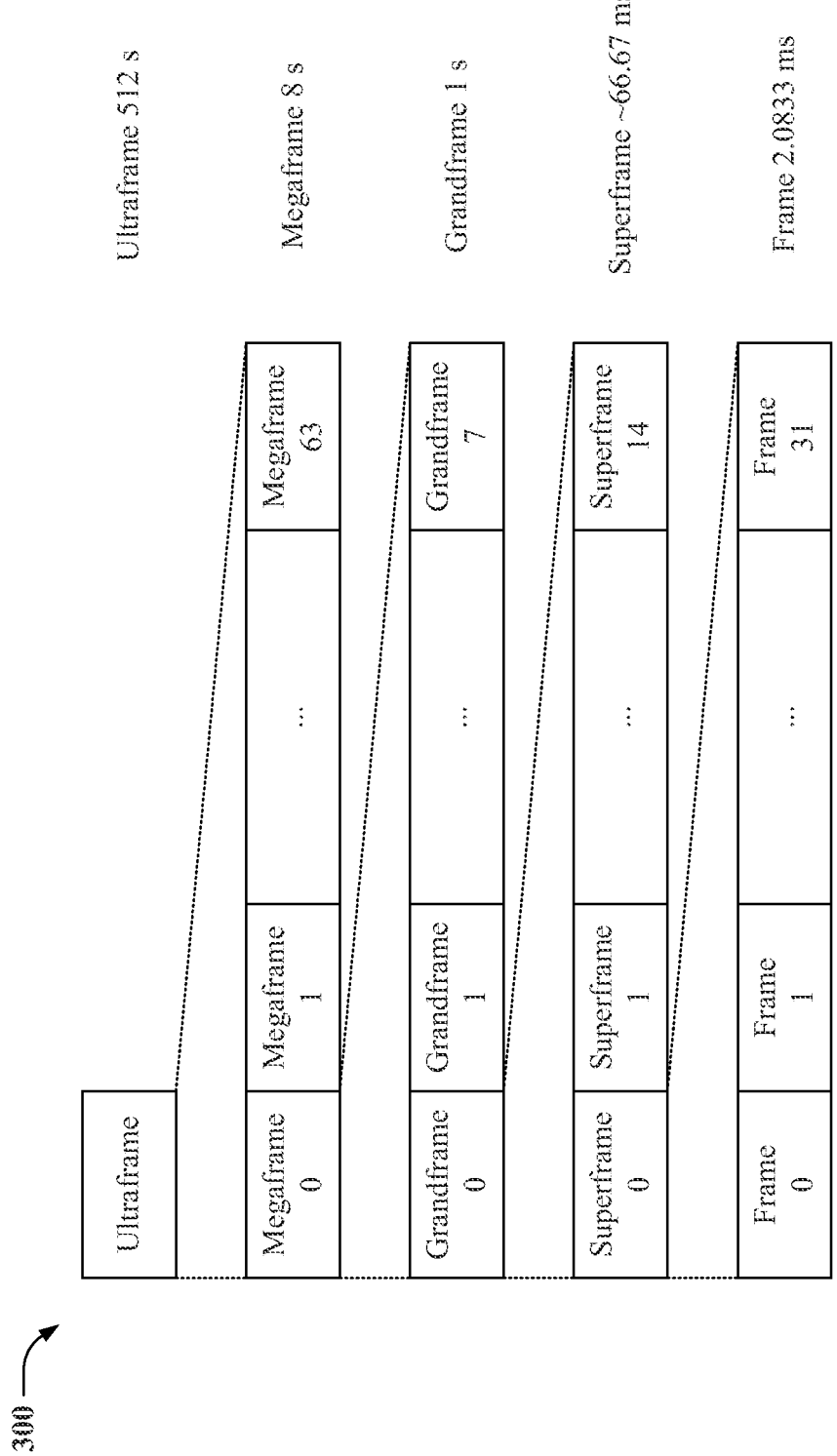
FIG. 3 is a diagram illustrating a time structure for peer-to-peer communication between the wireless devices.

FIG. 3 is a diagram 300 illustrating a time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
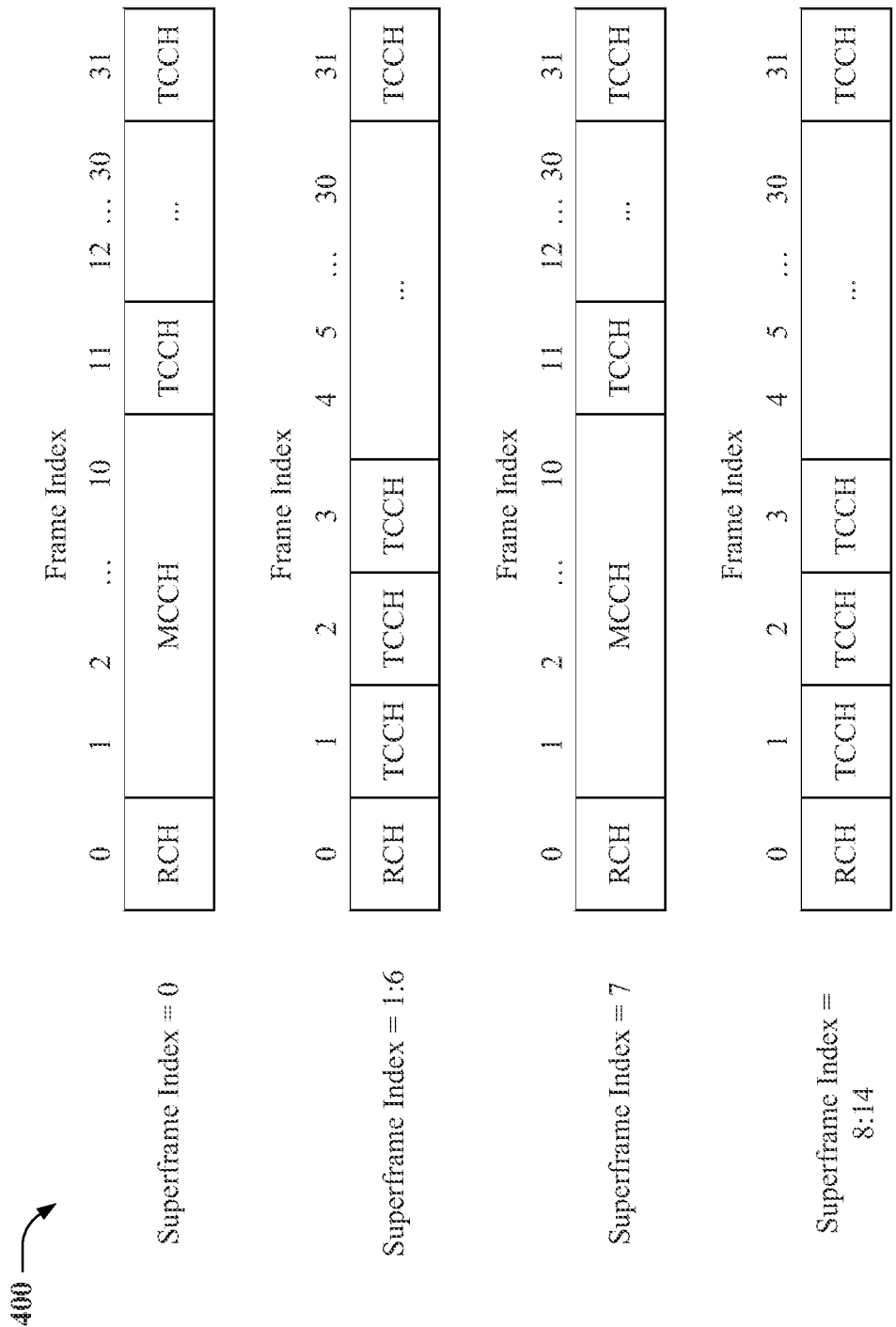
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
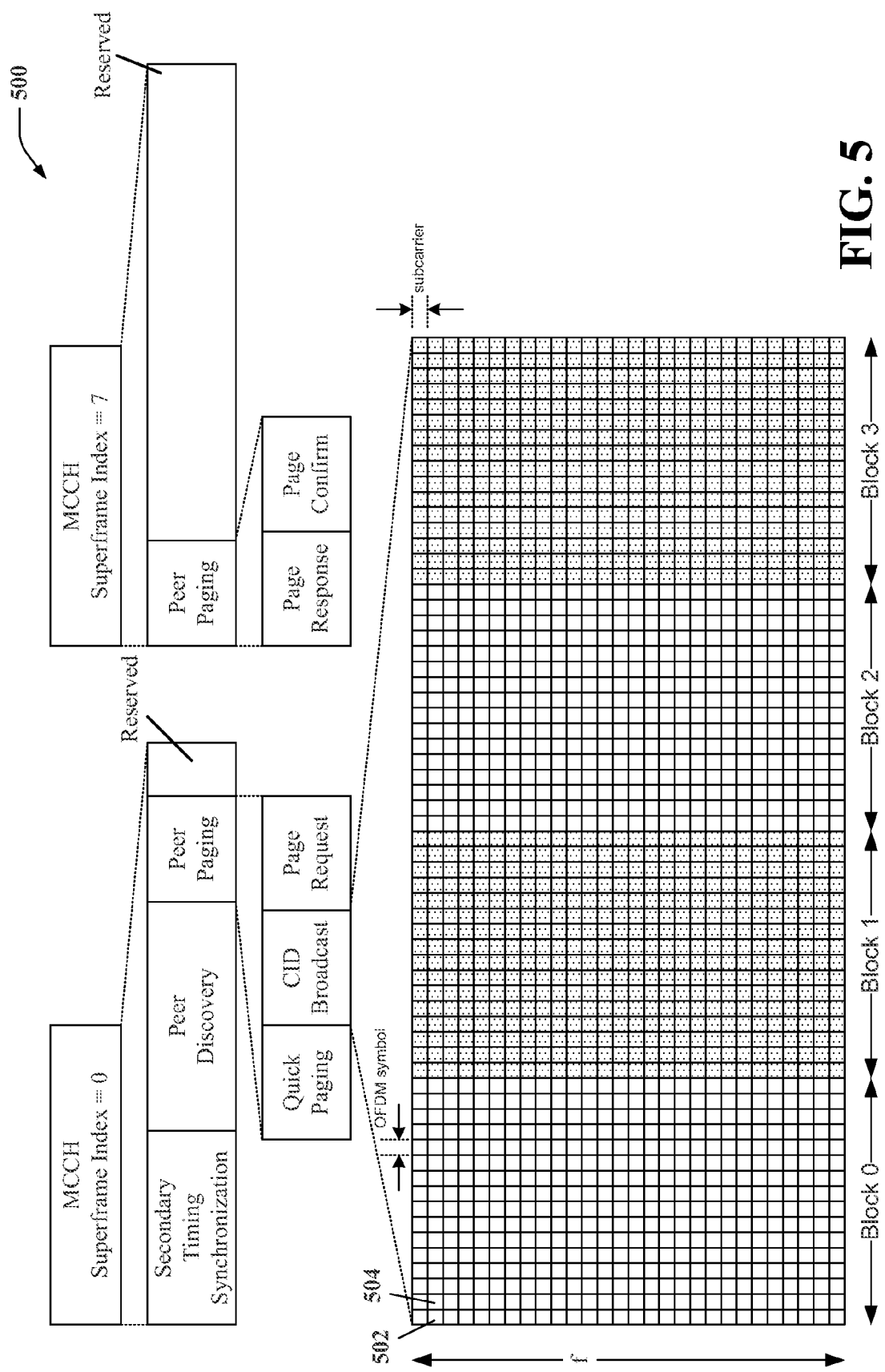
FIG. 5 is a diagram illustrating an operation timeline of a miscellaneous channel and a structure of a connection identifier broadcast.

FIG. 5 is a diagram 500 illustrating an operation timeline of the MCCH and a structure of a connection identifier (CID) broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

For example, assume a wireless device with a CID=4 selects Block 0 for the CID broadcast. The wireless device may be allocated resource elements 502, 504 for the CID broadcast. In resource element 502, the wireless device transmits an energy proportional to a power used to transmit in the TCCH. In resource element 504, the wireless device transmits an energy inversely proportional to a power received in the TCCH. In a subsequent grandframe, the wireless device may have a different pair of resource elements with a different subcarrier, but the same relative OFDM symbol position (i.e., in this example, the first and the second OFDM symbol of the selected block).

Figure 6:
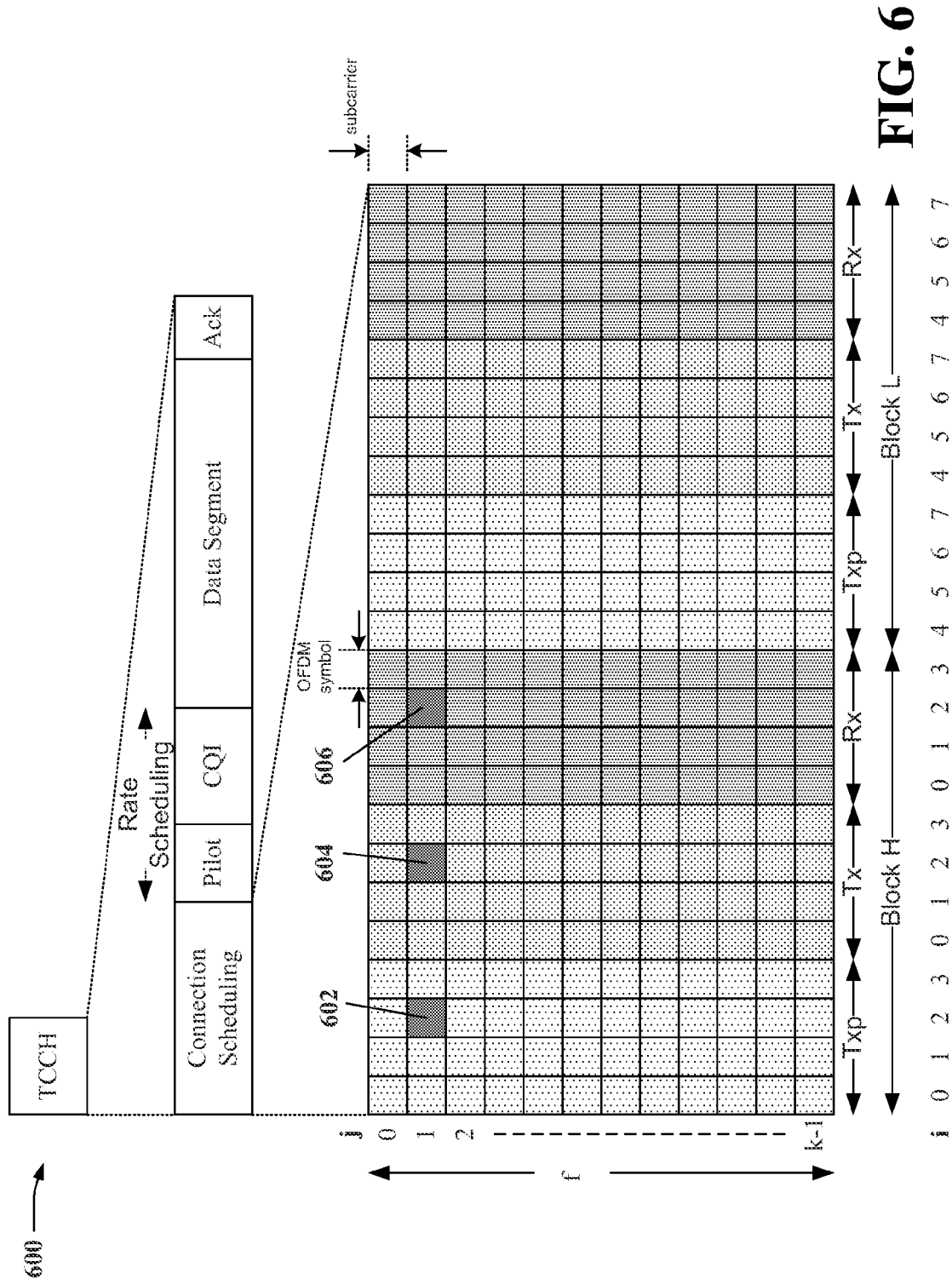
FIG. 6 is a diagram illustrating an operation timeline of a traffic channel slot and a structure of connection scheduling.

FIG. 6 is a diagram 600 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting an acknowledgment (ACK) or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 602 in the Txp-block of Block H, the resource element 604 in the Tx-block of Block H, and the resource element 606 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 602, 604, 606 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 602, 604, 606 correspond to a medium access priority of 58.

Figure 7B:
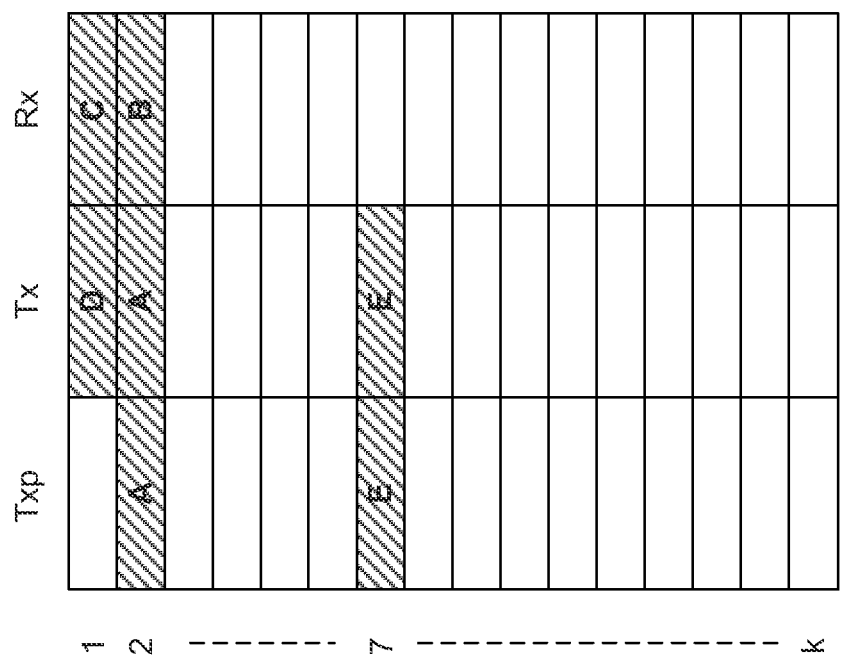
FIG. 7B is a second diagram for illustrating a connection scheduling signaling scheme for the wireless devices.
Figure 7A:
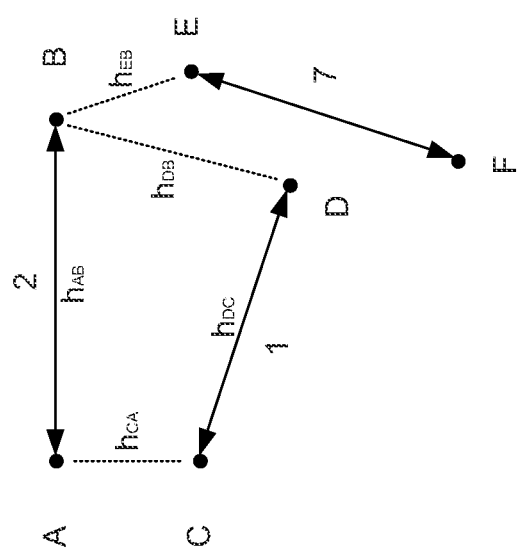
FIG. 7A is a first diagram for illustrating a connection scheduling signaling scheme for the wireless devices.

FIG. 7A is a first diagram for illustrating an exemplary connection scheduling signaling scheme for the wireless devices 100. As shown in FIG. 7A, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 7B is a second diagram for illustrating an exemplary connection scheduling signaling scheme for the wireless devices 100. FIG. 7B shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the pathloss between the node A and the node B. The node B receives the transmit request signal from the node D with a power equal to $P_D|h_{DB}|^2$, where $h_{DB}$ is the pathloss between the node D and the node B. The node B receives the transmit request signal from the node E with a power equal to $P_E|h_{EB}|^2$, where $h_{EB}$ is the pathloss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable signal to interference ratio (SIR) if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the pathloss between the node D and the node C, and K is a constant known to all nodes. The node A receives the transmit request response signal from the node C at a power equal to $K|h_{CA}|^2/P_D|h_{DC}|^2$, where $h_{CA}$ is the pathloss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

Figure 8:
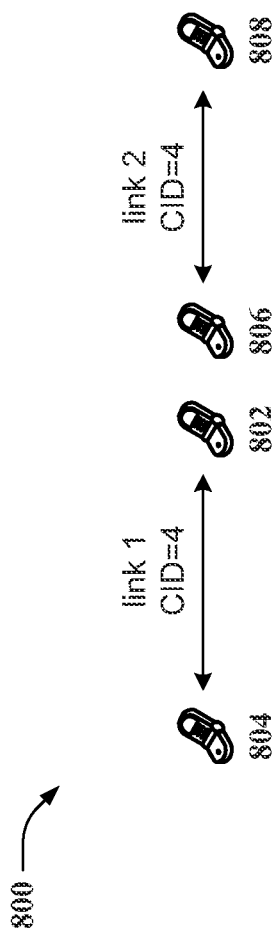
FIG. 8 is a diagram for illustrating a method of CID collision detection.

FIG. 8 is a diagram 800 for illustrating a method of CID collision detection. As described in relation to FIG. 5, CID collisions may be detected once every second during the CID broadcast. CID collisions may also be detected more frequently during connection scheduling. For example, assume wireless devices 802, 804 are in peer-to-peer communication in a first link (link 1), wireless devices 806, 808 are in peer-to-peer communication in a second link (link 2), wireless devices 802, 806 have transmit priority, and link 1 and link 2 have the same CID (e.g., CID=4). If the wireless device 802 transmits in the Txp-block, but the wireless device 806 does not, the wireless device 806 can determine that there is a CID collision, as the wireless device 806 will receive an unexpected transmission in its Txp-block. However, if both the wireless devices 802, 806 transmit in the Txp-block, due to their half-duplex nature, both of the wireless devices 802, 806 will not receive the other's transmission and therefore will have no way of knowing that there is a CID collision. Further, wireless devices 804, 808 would observe no abnormal activities because they both expect the possibility of receiving a transmission in the Txp-block.

Figure 9:
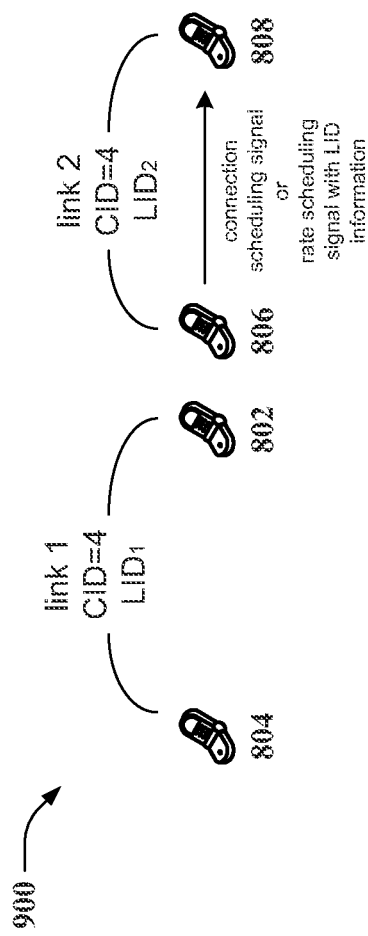
FIG. 9 is a diagram for illustrating an exemplary method of CID collision detection.

FIG. 9 is a diagram 900 for illustrating an exemplary method of CID collision detection. As shown in FIG. 9, link 1 and link 2 each have a unique link identifier (LID), assumed in this example to be $LID_1$ and $LID_2$, respectively. According to the exemplary method, LID information is transmitted with connection scheduling signals and/or rate scheduling signals. From the LID information, other links are able to detect CID collisions.

That is, to improve CID collision detection, whenever either node of a link transmits a connection scheduling signal or a rate scheduling signal, the signal contains information related to both the CID occupied by the link and an LID unique to the link (e.g., both node identifiers may be appended or combined together). Wireless devices that receive the signal can discern whether the received signal related to its CID is from a wireless device of its own link or a wireless device of another link that is using the same CID.

Figure 10:
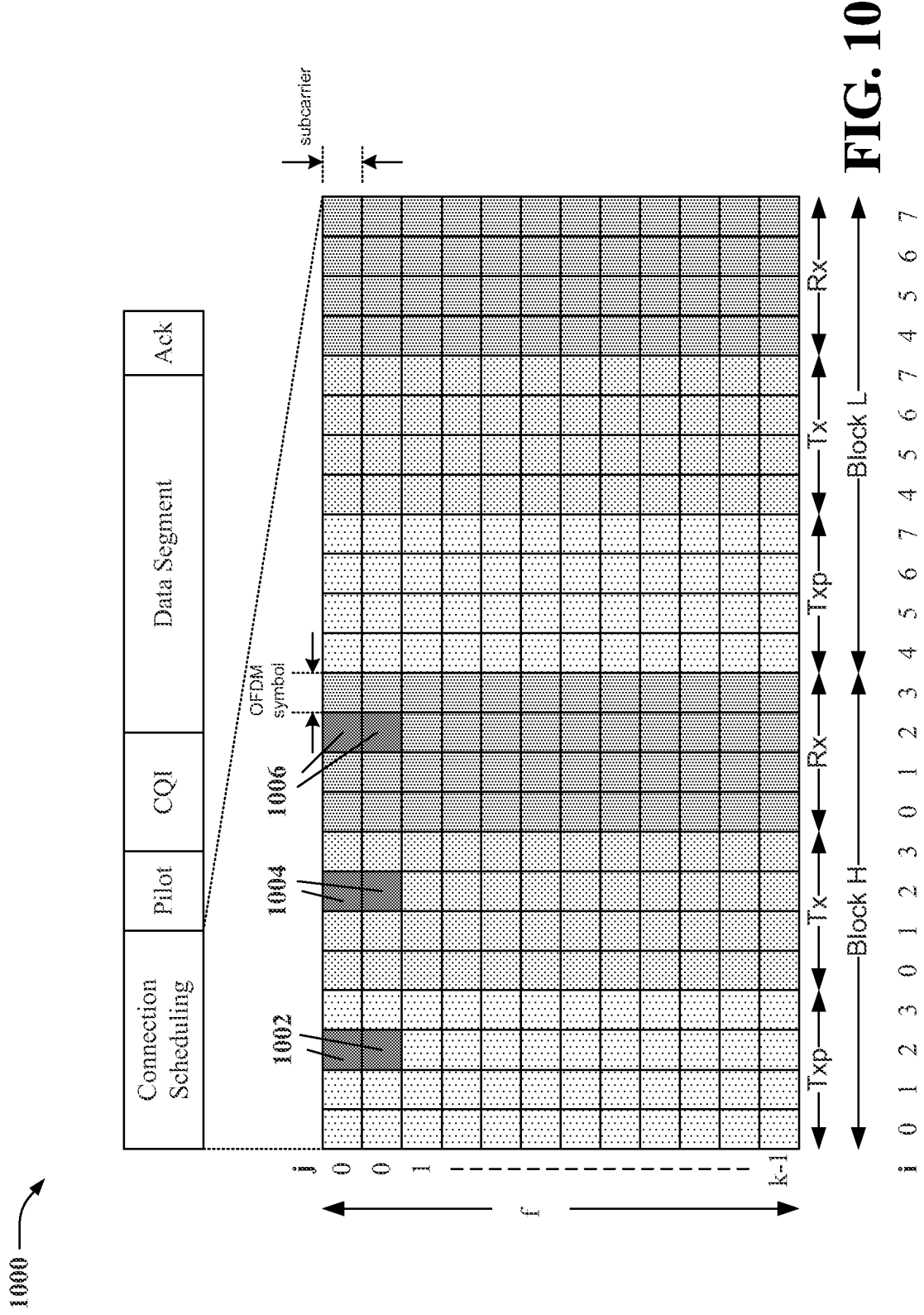
FIG. 10 is a diagram for illustrating an exemplary method of CID collision detection.

FIG. 10 is a diagram 1000 for illustrating an exemplary method of CID collision detection. As discussed supra in relation to FIG. 6, based on the CID, wireless devices in a link are allocated a resource element in the same respective OFDM symbol position in each of the Txp-block, the Tx-block, and the Rx-block at a particular subcarrier and within Block H or Block L. In one configuration, the LID information may be combined with the signal transmitted in the allocated resource, and therefore as shown in FIG. 6, the signal transmitted in the resource elements 602, 604, 606 may additionally contain the LID information. In an alternative configuration, wireless devices in a link are allocated additional resources for conveying the LID information. For example, as shown in FIG. 10, wireless devices in a link may be allocated two resource elements for two-tone signaling for each of the Txp-block, the Tx-block, and the Rx-block at particular subcarriers and within Block H or Block L. As such, a particular link may be allocated resource elements 1002 within the Txp-block, resources elements 1004 within the Tx-block, and resources elements 1006 within the Rx-block in order to perform connection scheduling while concurrently transmitting LID information. In such a configuration, a first resource element may convey power information and a second resource element may convey the LID. For example, of the two resource elements 1004, a first resource may convey a direct power signal and a second resource element may convey the LID information, and of the two resource elements 1006, a first resource may convey an inverse echo power signal and a second resource may convey the LID information. The LID information may be conveyed through a phase or amplitude difference between the two tones. That is, the phase or amplitude difference between the two signals on the pair of resources allocated to a link may be a function of the LID of the link.

Referring again to FIG. 9, if the wireless device 806 transmits a connection scheduling signal using resources based on a CID=4, and the connection scheduling signal includes information indicating an LID of $LID_2$, the wireless device 808 will observe the expected connection scheduling signal, while the wireless devices 802, 804 will receive an unexpected phase/amplitude difference between the tones and deduce that the signaling is from another link sharing the same CID.

Figure 11B:
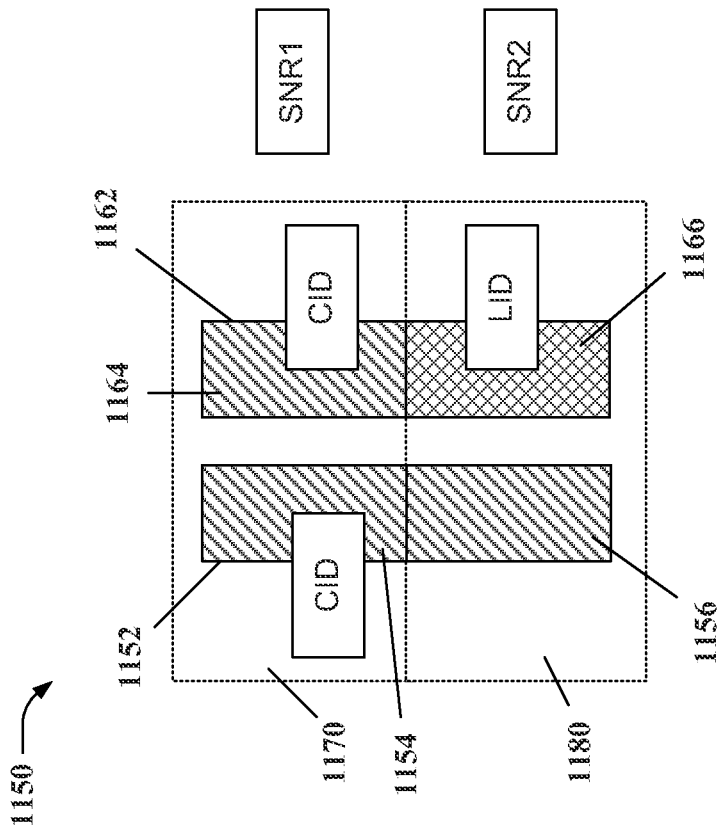
FIG. 11B is a diagram for illustrating yet another exemplary method of CID collision detection.
Figure 11A:
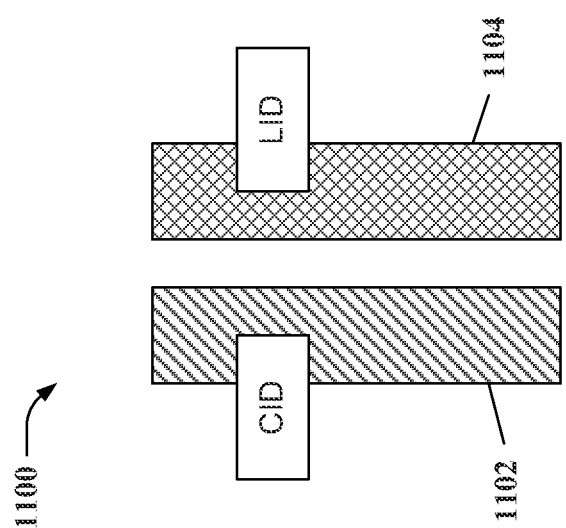
FIG. 11A is a diagram for illustrating another exemplary method of CID collision detection.

FIG. 11A is a diagram 1100 for illustrating another exemplary method of CID collision detection. FIG. 11B is a diagram 1150 for illustrating yet another exemplary method of CID collision detection. According to the method, in rate scheduling, when a wireless device sends a pilot signal, the pilot signal includes two parts: a first part determined by the CID and a second part determined by the LID or by both the LID and CID. For example, as shown in FIG. 11A, the pilot may include two pseudo-random noise (PN) sequences: a first PN sequence 1102 depending on the CID only and a second PN sequence 1104 depending on the LID only. If a receiving wireless device detects the first pilot PN sequence for its CID but does not detect the second pilot PN sequence for its LID, then the wireless device can deduce that there is a CID collision with other links. In order to deduce a CID collision, the wireless device may generate a first comparison signal based on the CID and compare the first comparison signal to the first PN sequence 1102. If the first comparison signal matches the first PN sequence 1102, the wireless device may generate a second comparison signal based on its LID with a first node. The wireless device then compares the second comparison signal to the second PN sequence 1104. The presence of a second node using the selected CID with a third node that is different from the first node may be determined when the second comparison signal does not match the second PN sequence 1104.

For another example, as shown in FIG. 11B, the pilot may include two PN sequences: a first PN sequence 1152 depending on the CID only and a second PN sequence 1162 depending on both the CID and the LID. The first PN sequence 1152 may have two parts, with a first part 1154 and a second part 1156 both depending on the CID. The second PN sequence 1162 may also have two parts, with a first part 1164 depending on the CID and a second part 1166 depending on the LID. A receiving wireless device may estimate the signal to noise ratio (SNR) (i.e., SNR1) using the part 1170 of the PN sequences dependent only on the CID and estimate the SNR (i.e., SNR2) using the part 1180 of the PN sequences dependent on both the CID and LID. The receiving wireless device can infer a CID collision from a statistical difference between SNR1 and SNR2.

Figure 12:
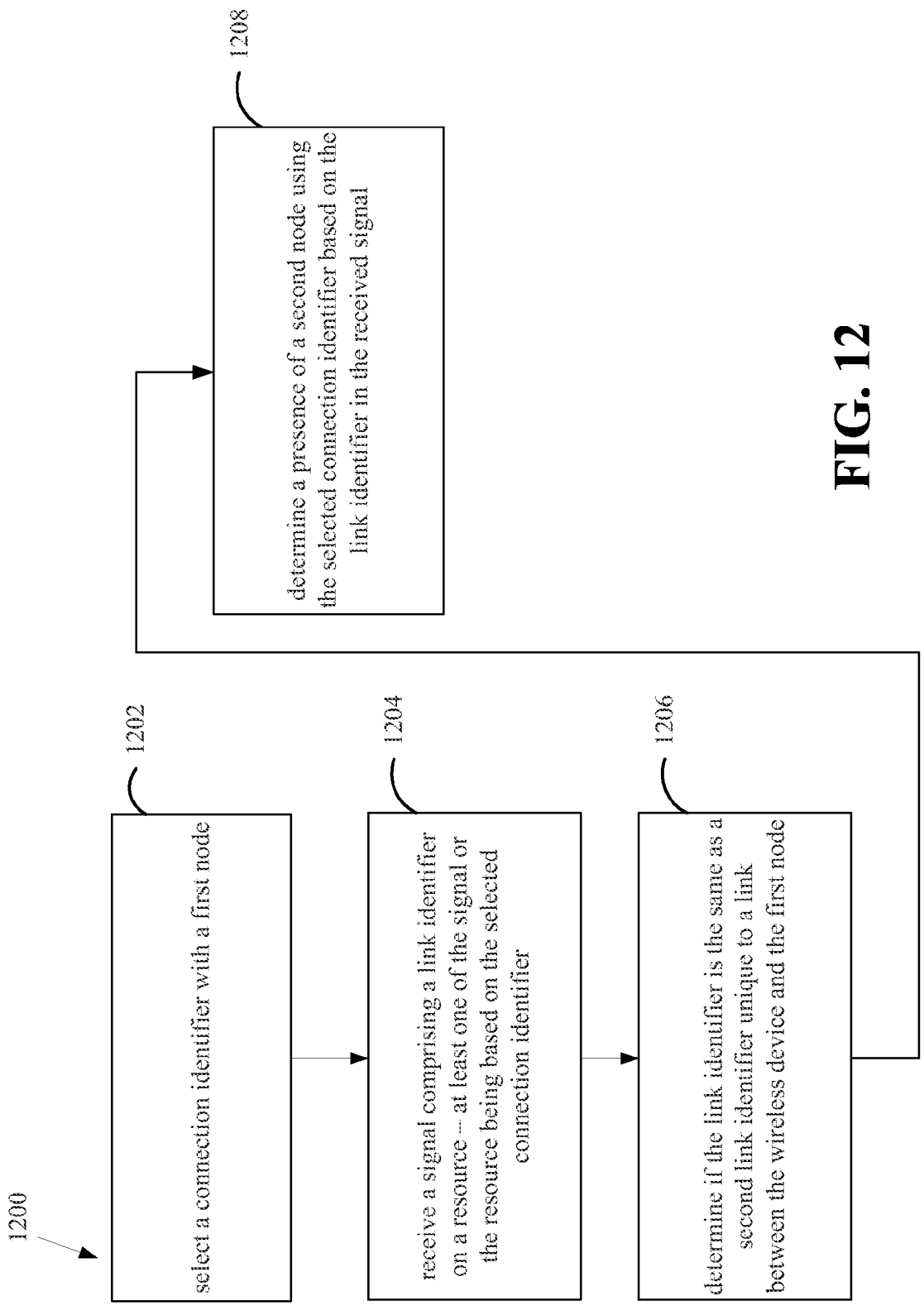
FIG. 12 is a flow chart of a method of wireless communication.

FIG. 12 is a flow chart 1200 of a method of wireless communication. The method is performed by a wireless device 100. The wireless device 100 selects a CID with a first node (1202). The wireless device 100 receives a signal including an LID on a resource (1204). At least one of the signal or the resource is based on the selected CID (1204). For example, the pilot signal sent in rate scheduling and the resource used for connection scheduling are based on the selected CID. The wireless device 100 determines if the received LID is the same as a second LID unique to a link between the wireless device and the first node (1206). The wireless device 100 then determines a presence of a second node using the selected CID with a third node different than the first node based on the LID in the received signal (1208). The LID may be unique to a corresponding link or at least have a low probability of being the same as another link. The presence of the second node using the selected CID with a third node may be determined when the received LID is different from the second LID. As discussed supra, the signal may be a connection scheduling signal, and therefore the resource may be based on the selected CID. The connection scheduling signal may be received on at least two tones. When the connection scheduling signal is received on at least two tones, the wireless device 100 may determine the LID through the at least two tones through at least one of an amplitude difference or a phase difference between the two tones.

Figure 13:
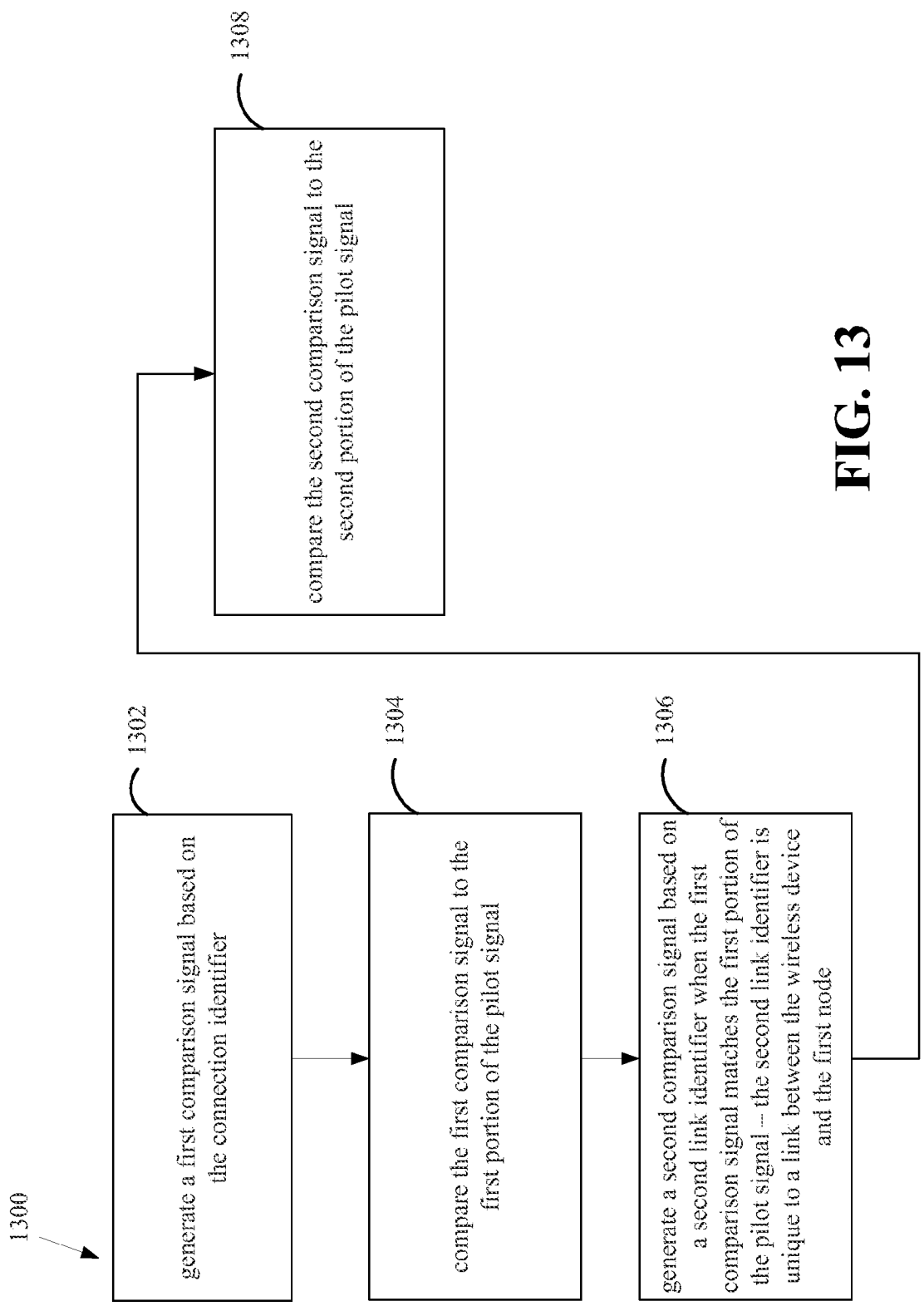
FIG. 13 is another flow chart of a method of wireless communication.

FIG. 13 is another flow chart 1300 of a method of wireless communication. The method is performed by a wireless device 100. As discussed supra, the signal received in 1204 may be a pilot signal received in a rate scheduling channel that is generated based on the CID and the LID. A first portion (e.g., 1102) of the pilot signal may be generated based on the CID and a second portion (e.g., 1104) of the pilot signal may be generated based on the LID. The wireless device 100 may generate a first comparison signal based on the CID (1302) and compare the first comparison signal to the first portion of the pilot signal (1304). The wireless device 100 may generate a second comparison signal based on a second LID when the first comparison signal matches the first portion of the pilot signal (1306). The second LID may be unique to a link between the wireless device and the first node (1306). The wireless device 100 then compares the second comparison signal to the second portion of the pilot signal (1308). The presence of the second node using the selected CID with a third node may be determined when the second comparison signal does not match the second portion of the pilot signal.

Figure 14:
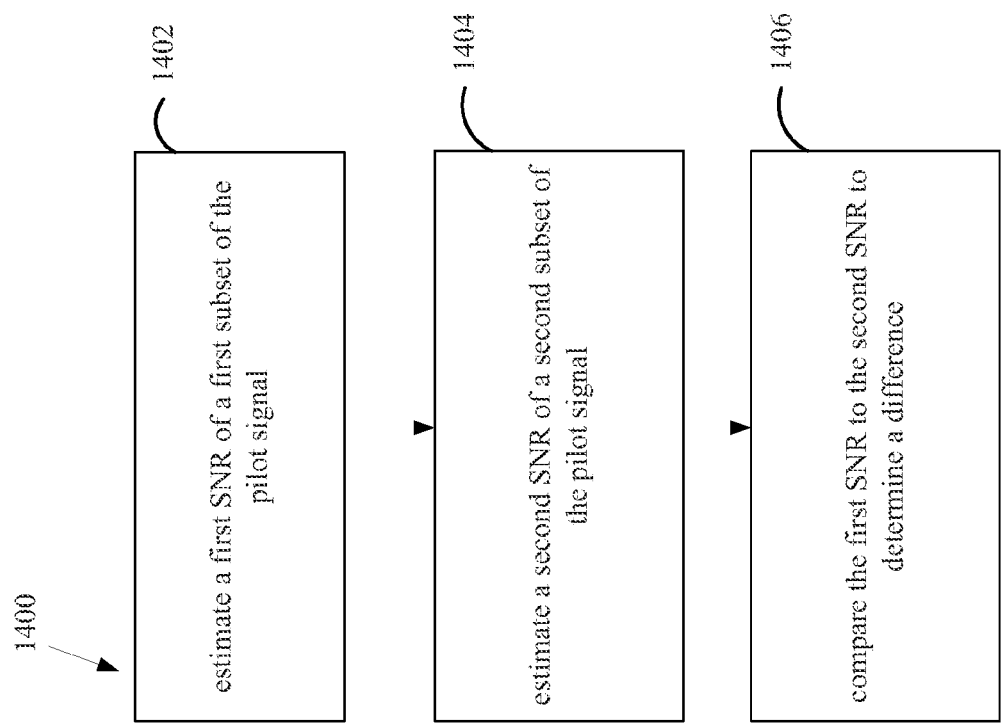
FIG. 14 is yet another flow chart of a method of wireless communication.

FIG. 14 is yet another flow chart 1400 of a method of wireless communication. The method is performed by a wireless device 100. According to the method, the second portion of the pilot signal may also be generated based on the CID. As discussed in relation to FIG. 11B, the first portion 1152 of the pilot signal includes a first segment 1154 and a second segment 1156. The first segment 1154 of the first portion 1152 is generated based on the CID and the second segment 1156 of the first portion 1152 is also generated based on the CID. The second portion 1162 of the pilot signal comprises a first segment 1164 and a second segment 1166. The first segment 1164 of the second portion 1162 is generated based on the CID and the second segment 1166 of the second portion 1162 is generated based on the LID. According to the method, the wireless device 100 estimates a first SNR of a first subset 1170 of the pilot signal (1402). The first subset 1170 of the pilot signal includes the first segment 1154 of the first portion 1152 generated based on the CID and the first segment 1164 of the second portion 1162 generated based on the CID. In addition, the wireless device 100 estimates a second SNR of a second subset 1180 of the pilot signal (1404). The second subset 1180 of the pilot signal includes the second segment 1156 of the first portion 1152 generated based on the CID and the second segment 1166 of the second portion 1162 generated based on the LID. Furthermore, the wireless device 100 compares the first SNR to the second SNR to determine a difference (1406). The presence of the second node using the selected CID with a third node is determined based on the difference. That is, when the difference is greater than a threshold, the wireless device 100 determines the presence of the second node using its CID with a third node.

Figure 15:
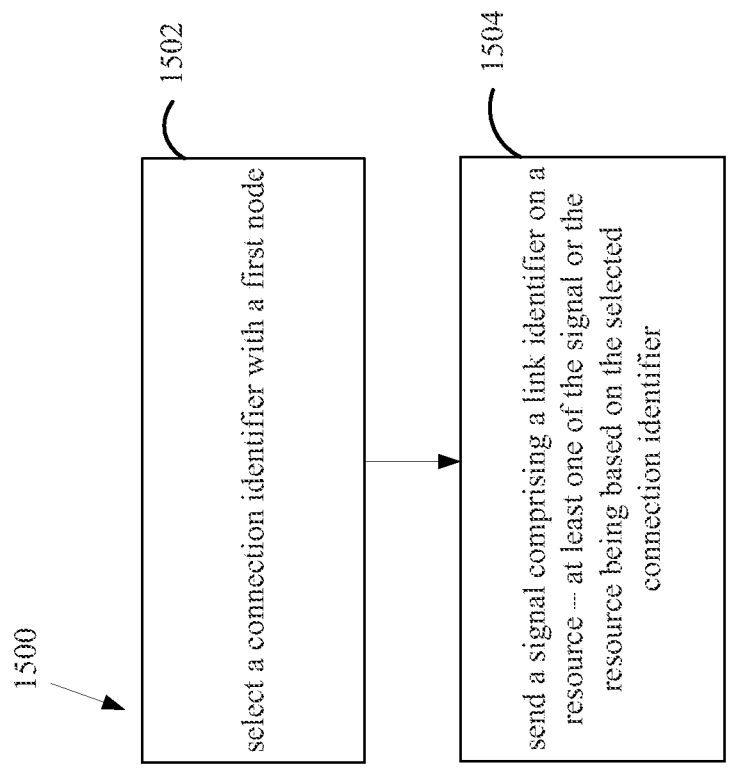
FIG. 15 is a flow chart of another method of wireless communication.

FIG. 15 is a flow chart 1500 of another method of wireless communication. The method is performed by a wireless device 100. The wireless device 100 selects a CID with a first node (1502) and sends a signal including an LID on a resource (1504). At least one of the signal or the resource is based on the selected CID. The LID may be unique to a link between the wireless device and the first node. In one configuration, the signal is a connection scheduling signal, the resource is based on the selected CID, and the connection scheduling signal is sent on at least two tones. The signal may convey the LID through at least two tones through one of an amplitude difference or a phase difference between the two tones. In one configuration, the signal is a pilot signal sent in a rate scheduling channel. In such a configuration, the wireless device 100 generates the signal based on the CID and the LID. A first portion of the pilot signal may be generated based on the CID and a second portion of the pilot signal may be generated based on the LID. In one configuration, the second portion of the pilot signal is also generated based on the CID.

Figure 16:
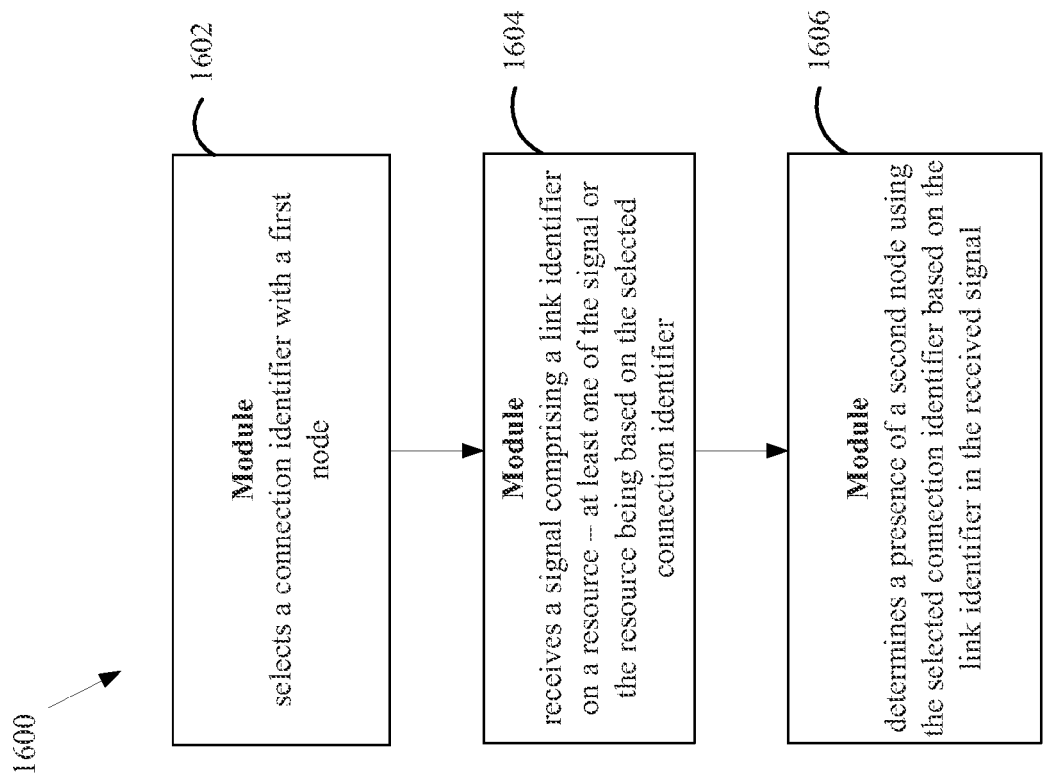
FIG. 16 is a conceptual block diagram illustrating the functionality of an exemplary apparatus.

FIG. 16 is a conceptual block diagram illustrating the functionality of an exemplary apparatus 100. The exemplary apparatus 100 may be a wireless device. The apparatus 100 includes a module 1602 that selects a CID with a first node. In addition, the apparatus 100 includes a module 1604 that receives a signal including an LID on a resource. At least one of the signal or the resource is based on the selected CID. Furthermore, the apparatus 100 includes a module 1606 that determines a presence of a second node using the selected CID with a third node different than the first node based on the LID in the received signal.

Figure 17:
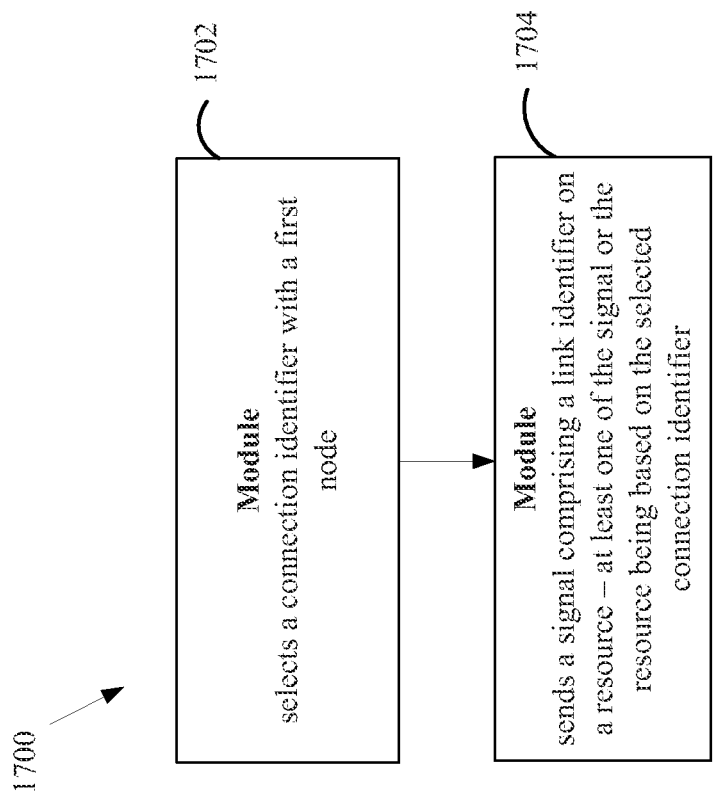
FIG. 17 is another conceptual block diagram illustrating the functionality of an exemplary apparatus.

FIG. 17 is another conceptual block diagram illustrating the functionality of an exemplary apparatus 100. The exemplary apparatus 100 may be a wireless device. The apparatus 100 includes a module 1702 that selects a CID with a first node and a module 1704 that sends a signal including an LID on a resource. At least one of the signal or the resource is based on the selected CID.

Referring to FIG. 1, in one configuration, the apparatus 100 for wireless communication includes means for selecting a CID with a first node and means for receiving a signal including an LID on a resource. At least one of the signal or the resource is based on the selected CID. The apparatus 100 further includes means for determining a presence of a second node using the selected CID based on the LID in the received signal. The apparatus 100 may further include means for determining if the LID is the same as a second LID unique to a link between the wireless device and the first node. The presence of the second node using the selected CID may be determined when the LID is different from the second LID. In one configuration, the signal is a connection scheduling signal, the resource is based on the selected CID, and the connection scheduling signal is received on at least two tones. In such a configuration, the apparatus 100 may further include means for determining the LID through the at least two tones. In one configuration, the signal is a pilot signal received in a rate scheduling channel that is generated based on the CID and the LID and a first portion of the pilot signal is generated based on the CID and a second portion of the pilot signal is generated based on the LID. In such a configuration, the apparatus 100 may further include means for generating a first comparison signal based on the CID, means for comparing the first comparison signal to the first portion of the pilot signal, and means for generating a second comparison signal based on a second LID when the first comparison signal matches the first portion of the pilot signal. The second LID is unique to a link between the wireless device and the first node. The apparatus 100 may further include means for comparing the second comparison signal to the second portion of the pilot signal. The presence of the second node using the selected CID may be determined when the second comparison signal does not match the second portion of the pilot signal. In another configuration, the second portion of the pilot signal is also generated based on the CID. The first portion of the pilot signal may include a first segment and a second segment. The first segment of the first portion is generated based on the CID and the second segment of the first portion is generated based on the CID. The second portion of the pilot signal may include a first segment and a second segment. The first segment of the second portion is generated based on the CID and the second segment of the second portion being generated based on the LID. In such a configuration, the apparatus 100 may further include means for estimating a first SNR of a first subset of the pilot signal. The first subset of the pilot signal includes the first segment of the first portion generated based on the CID and the first segment of the second portion generated based on the CID. In addition, the apparatus 100 may further include means for estimating a second SNR of a second subset of the pilot signal. The second subset of the pilot signal includes the second segment of the first portion generated based on the CID and the second segment of the second portion generated based on the LID. Furthermore, the apparatus 100 may include means for comparing the first SNR to the second SNR to determine a difference. The presence of the second node using the selected CID may be determined based on the difference. The aforementioned means is the processing system 114 configured to perform the functions recited by the aforementioned means.

In another configuration, the apparatus 100 includes means for selecting a CID with a first node and means for sending a signal including an LID on a resource. At least one of the signal or the resource is based on the selected CID. The signal may be a pilot signal sent in a rate scheduling channel. In such a configuration, the apparatus may further include means for generating the signal based on the CID and the LID. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
   selecting a connection identifier with a first mobile station;
   receiving a signal comprising a link identifier on a resource, at least one of the signal or the resource being based on the selected connection identifier;
   determining if the link identifier is the same as a second link identifier unique to a link between the wireless device and the first mobile station; and
   determining that the received signal is from a second mobile station that uses both the selected connection identifier and the link identifier to communicate to a third mobile station that is different from the first mobile station, when the link identifier is different from the second link identifier.

wherein the signal is a pilot signal received in a rate scheduling channel that is generated based on the connection identifier and the link identifier, and wherein a first portion of the pilot signal is generated based on the connection identifier and a second portion of the pilot signal is generated based on the link identifier and the connection identifier.

2. The method of claim 1, wherein the link identifier is unique to a corresponding link.

3. The method of claim 1, wherein the signal is a connection scheduling signal, the resource is based on the selected connection identifier, and the connection scheduling signal is received on at least two tones.

4. The method of claim 3, further comprising determining the link identifier through the at least two tones.

5. A method of operating a wireless device, comprising:
selecting a connection identifier with a first node;
receiving a signal comprising a link identifier on a resource, at least one of the signal or the resource being based on the selected connection identifier, wherein the signal is a pilot signal received in a rate scheduling channel that is generated based on the connection identifier and the link identifier, and a first portion of the pilot signal is generated based on the connection identifier and a second portion of the pilot signal is generated based on the link identifier;
determining a presence of a second node that uses the selected connection identifier based on the link identifier in the received signal;
generating a first comparison signal based on the connection identifier;
comparing the first comparison signal to the first portion of the pilot signal;
generating a second comparison signal based on a second link identifier when the first comparison signal matches the first portion of the pilot signal, the second link identifier being unique to a link between the wireless device and the first node; and
comparing the second comparison signal to the second portion of the pilot signal,
wherein the presence of the second node that uses the selected connection identifier is determined when the second comparison signal does not match the second portion of the pilot signal.

6. A method of operating a wireless device, comprising:
selecting a connection identifier with a first node;
receiving a signal comprising a link identifier on a resource, at least one of the signal or the resource being based on the selected connection identifier, wherein the signal is a pilot signal received in a rate scheduling channel that is generated based on the connection identifier and the link identifier, and a first portion of the pilot signal is generated based on the connection identifier and a second portion of the pilot signal is generated based on the link identifier and the connection identifier; and
determining a presence of a second node that uses the selected connection identifier based on the link identifier in the received signal;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

7. The method of claim 6, further comprising:
estimating a first signal to noise ratio (SNR) of a first subset of the pilot signal, the first subset of the pilot signal comprising the first segment of the first portion generated based on the connection identifier and the first segment of the second portion generated based on the connection identifier;
estimating a second SNR of a second subset of the pilot signal, the second subset of the pilot signal comprising the second segment of the first portion generated based on the connection identifier and the second segment of the second portion generated based on the link identifier; and
comparing the first SNR to the second SNR to determine a difference,
wherein the presence of the second node using the selected connection identifier is determined based on the difference.

8. A method of operating a wireless device, comprising:
selecting a connection identifier with a first node; and
sending a signal comprising a link identifier on a resource, at least one of the signal or the resource being based on the selected connection identifier, wherein the signal is a pilot signal sent in a rate scheduling channel, the pilot signal being generated based on the connection identifier and the link identifier, wherein a first portion of the pilot signal is generated based on the connection identifier and a second portion of the pilot signal is generated based on the link identifier and the connection identifier;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

9. The method of claim 8, wherein the link identifier is unique to a link between the wireless device and the first node.

10. An apparatus for wireless communication, comprising:
means for selecting a connection identifier with a first mobile station;
means for receiving a signal comprising a link identifier on a resource, at least one of the signal or the resource being based on the selected connection identifier;
means for determining if the link identifier is the same as a second link identifier unique to a link between the apparatus and the first mobile station;
means for determining that the received signal is from a second mobile station that uses both the selected connection identifier and the link identifier to communicate to a third mobile station that is different from the first mobile station, when the link identifier is different from the second link identifier,
wherein the signal is a pilot signal received in a rate scheduling channel that is generated based on the connection identifier and the link identifier, and
wherein a first portion of the pilot signal is generated based on the connection identifier and a second portion of the pilot signal is generated based on the link identifier and the connection identifier.

11. The apparatus of claim 10, wherein the link identifier is unique to a corresponding link.

12. The apparatus of claim 10, wherein the signal is a connection scheduling signal, the resource is based on the selected connection identifier, and the connection scheduling signal is received on at least two tones.

13. The apparatus of claim 12, further comprising means for determining the link identifier through the at least two tones.

14. An apparatus for wireless communication, comprising:
means for selecting a connection identifier with a first node;
means for receiving a signal comprising a link identifier on a resource, at least one of the signal or the resource being based on the selected connection identifier, wherein the signal is a pilot signal received in a rate scheduling channel that is generated based on the connection identifier and the link identifier, and a first portion of the pilot signal is generated based on the connection identifier and a second portion of the pilot signal is generated based on the link identifier;
means for determining a presence of a second node that uses the selected connection identifier based on the link identifier in the received signal;
means for generating a first comparison signal based on the connection identifier;
means for comparing the first comparison signal to the first portion of the pilot signal;
means for generating a second comparison signal based on a second link identifier when the first comparison signal matches the first portion of the pilot signal, the second link identifier being unique to a link between the apparatus and the first node; and
means for comparing the second comparison signal to the second portion of the pilot signal,
wherein the presence of the second node using the selected connection identifier is determined when the second comparison signal does not match the second portion of the pilot signal.

15. An apparatus for wireless communication, comprising:
means for selecting a connection identifier with a first node;
means for receiving a signal comprising a link identifier on a resource, at least one of the signal or the resource being based on the selected connection identifier, wherein the signal is a pilot signal received in a rate scheduling channel that is generated based on the connection identifier and the link identifier, and a first portion of the pilot signal is generated based on the connection identifier and a second portion of the pilot signal is generated based on the link identifier; and
means for determining a presence of a second node that uses the selected connection identifier based on the link identifier in the received signal;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

16. The apparatus of claim 15, further comprising:
means for estimating a first signal to noise ratio (SNR) of a first subset of the pilot signal, the first subset of the pilot signal comprising the first segment of the first portion generated based on the connection identifier and the first segment of the second portion generated based on the connection identifier;
means for estimating a second SNR of a second subset of the pilot signal, the second subset of the pilot signal comprising the second segment of the first portion generated based on the connection identifier and the second segment of the second portion generated based on the link identifier; and
means for comparing the first SNR to the second SNR to determine a difference,
wherein the presence of the second node using the selected connection identifier is determined based on the difference.

17. An apparatus for wireless communication, comprising:
means for selecting a connection identifier with a first node; and
means for sending a signal comprising a link identifier on a resource, at least one of the signal or the resource being based on the selected connection identifier, wherein the signal is a pilot signal sent in a rate scheduling channel, the pilot signal being generated based on the connection identifier and the link identifier, wherein a first portion of the pilot signal is generated based on the connection identifier and a second portion of the pilot signal is generated based on the link identifier and the connection identifier;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

18. The apparatus of claim 17, wherein the link identifier is unique to a link between the apparatus and the first node.

19. A computer program product in a wireless device, comprising:
a non-transitory computer-readable medium comprising code for:
selecting a connection identifier with a first mobile station;
receiving a signal comprising a link identifier on a resource, at least one of the signal or the resource being based on the selected connection identifier;
determining if the link identifier is the same as a second link identifier unique to a link between the wireless device and the first mobile station; and
determining that the received signal is from a second mobile station that uses both the selected connection identifier and the link identifier to communicate to a third mobile station that is different from the first mobile station, when the link identifier is different from the second link identifier,
wherein the signal is a pilot signal received in a rate scheduling channel that is generated based on the connection identifier and the link identifier, and
wherein a first portion of the pilot signal is generated based on the connection identifier and a second portion of the pilot signal is generated based on the link identifier and the connection identifier.

20. A computer program product in a wireless device, comprising:
a non-transitory computer-readable medium comprising code for:
selecting a connection identifier with a first node; and
sending a signal comprising a link identifier on a resource, at least one of the signal or the resource being based on the selected connection identifier, wherein the signal is a pilot signal sent in a rate scheduling channel, the pilot signal being generated based on the connection identifier and the link identifier, wherein a first portion of the pilot signal is generated based on the connection identifier and a second portion of the pilot signal is generated based on the link identifier and the connection identifier;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

21. An apparatus for wireless communication, comprising:
a processing system configured to:
select a connection identifier with a first mobile station;
receive a signal comprising a link identifier on a resource, at least one of the signal or the resource being based on the selected connection identifier;
determine if the link identifier is the same as a second link identifier unique to a link between the wireless device and the first mobile station; and
determine that the received signal is from a second mobile station that uses both the selected connection identifier and the link identifier to communicate to a third mobile station that is different from the first mobile station, when the link identifier is different from the second link identifier,
wherein the signal is a pilot signal received in a rate scheduling channel that is generated based on the connection identifier and the link identifier, and
wherein a first portion of the pilot signal is generated based on the connection identifier and a second portion of the pilot signal is generated based on the link identifier and the connection identifier.

22. An apparatus for wireless communication, comprising:
a processing system configured to:
select a connection identifier with a first node; and
send a signal comprising a link identifier on a resource, at least one of the signal or the resource being based on the selected connection identifier, wherein the signal is a pilot signal sent in a rate scheduling channel, the pilot signal being generated based on the connection identifier and the link identifier, wherein a first portion of the pilot signal is generated based on the connection identifier and a second portion of the pilot signal is generated based on the link identifier and the connection identifier;
wherein the first portion of the pilot signal comprises a first segment and a second segment, the first segment of the first portion being generated based on the connection identifier and the second segment of the first portion being generated based on the connection identifier, wherein the second portion of the pilot signal comprises a first segment and a second segment, the first segment of the second portion being generated based on the connection identifier and the second segment of the second portion being generated based on the link identifier.

* * * * *